(12) United States Patent
Yunoki et al.

(10) Patent No.: US 7,022,643 B2
(45) Date of Patent: Apr. 4, 2006

(54) PRODUCTION PROCESS FOR CATALYST

(75) Inventors: Hiromi Yunoki, Himeji (JP); Michio Tanimoto, Himeji (JP); Daisuke Nakamura, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 125 days.

(21) Appl. No.: 10/632,030

(22) Filed: Jul. 31, 2003

(65) Prior Publication Data

US 2004/0058812 A1  Mar. 25, 2004

Related U.S. Application Data

(63) Continuation-in-part of application No. 10/615,435, filed on Jul. 8, 2003, now abandoned.

(30) Foreign Application Priority Data

Aug. 20, 2002 (JP) ............... 2002-239713

(51) Int. Cl.
  *B01J 23/00* (2006.01)
  *B01J 20/00* (2006.01)
  *B01J 21/00* (2006.01)

(52) U.S. Cl. ............... 502/300; 502/66; 502/74; 502/87; 502/179; 502/214; 502/242; 502/247; 502/249; 502/255; 502/258; 502/263; 502/305; 502/308; 502/309; 502/321; 502/322; 502/323; 502/325; 502/326; 502/327; 502/336; 502/338; 502/350; 502/351; 502/353; 502/354; 502/407; 502/415; 502/439

(58) Field of Classification Search ............... 502/66, 502/74, 87, 179, 214, 242, 247, 249, 255, 502/258, 263, 300, 305, 308, 309, 321, 322, 502/323, 325–327, 336, 338, 350, 351, 353, 502/354, 407, 415, 439; 422/224, 232
See application file for complete search history.

(56) References Cited

U.S. PATENT DOCUMENTS

| | | |
|---|---|---|
| 4,297,247 A | 10/1981 | Krabetz et al. |
| 4,442,308 A | 4/1984 | Arntz et al. |
| 4,873,217 A | 10/1989 | Kawajiri et al. |
| 5,446,004 A | 8/1995 | Tenten et al. |
| 5,493,052 A | 2/1996 | Tenten et al. |

(Continued)

FOREIGN PATENT DOCUMENTS

DE  196 23 413 A1  12/1997

(Continued)

OTHER PUBLICATIONS

The Society of Chemical Engineers-Japan, Collected Summaries of Research Results Presentation Lectures at 53rd Annual Meeting of the Society of Chemical Engineers-Japan, 1988, p. 128 (C310), No. 1, The Society of Chemical Engineers-Japan, Japan.

*Primary Examiner*—Cam N. Nguyen

(57) ABSTRACT

There is disclosed a production process for a catalyst which process makes it possible to efficiently carry out the supporting of a catalytic component onto a carrier and to obtain the catalyst excellent in quality and performance. This production process is a production process for the catalyst including a particulate lump carrier and a catalytic component supported thereon; with the production process comprising the step of carrying out simultaneous revolution and rocking of a treatment container 20 as charged with the carrier and a catalyst precursor including the catalytic component, thereby supporting the catalytic component onto the carrier.

2 Claims, 1 Drawing Sheet

U.S. PATENT DOCUMENTS

| | | | | |
|---|---|---|---|---|
| 5,723,403 A | * | 3/1998 | Durand et al. | 502/304 |
| 5,959,143 A | | 9/1999 | Sugi et al. | |
| 6,303,537 B1 | * | 10/2001 | Wang et al. | 502/330 |
| 6,753,291 B1 | * | 6/2004 | Eijsbouts et al. | 502/216 |
| 6,821,923 B1 | * | 11/2004 | Kuperman et al. | 502/344 |

FOREIGN PATENT DOCUMENTS

| | | |
|---|---|---|
| EP | 0 017 000 A1 | 10/1980 |
| EP | 0 293 859 A1 | 12/1988 |
| EP | 0 807 465 A1 | 11/1997 |
| FR | 2 750 619 A1 | 1/1998 |
| GB | 1 496 832 | 1/1978 |
| JP | 57-3415 B2 | 1/1982 |
| JP | 57-110338 A | 7/1982 |
| JP | 58-930 A | 1/1983 |
| JP | 58-15176 B2 | 3/1983 |
| JP | 63-315147 A | 12/1988 |
| JP | 64-58336 A | 3/1989 |
| JP | 5-42295 B2 | 6/1993 |
| JP | 6-31171 A | 2/1994 |
| JP | 6-279030 A | 10/1994 |
| JP | 8-299797 A | 11/1996 |
| JP | 10-192675 A | 7/1998 |

* cited by examiner

PRODUCTION PROCESS FOR CATALYST

This is a continuation-in-part of U.S. patent application Ser. No. 10/615,435 filed Jul. 8, 2003 abandoned and claims the benefit thereof under 35 U.S.C. § 120.

BACKGROUND OF THE INVENTION

A. Technical Field

The present invention relates to a production process for a catalyst. More particularly, the present invention is intended for the production process for a catalyst which is utilized for various chemical reactions (e.g. reforming, cracking, (amm)oxidation, and reduction of hydrocarbons) in the form such that a catalytic component (e.g. metal elements) is supported on a carrier.

B. Background Art

Catalysts in the form such that a catalytic component is supported on a particulate lump carrier (such catalysts may hereinafter be referred to simply as "supported catalysts") can efficiently be brought into contact with a liquid or gaseous substance as a reactant or are easy to handle. Therefore, such catalysts are widely utilized as catalysts for production of various chemicals.

As a process for supporting the catalytic component onto the carrier, there is known a process including the steps of: charging a treatment container with a particulate lump carrier and a solution or powder of a catalyst precursor as a source for supplying the catalytic component; and then stir-mixing them together. By this stir-mixing treatment, the catalyst precursor adheres to or is impregnated into outer surfaces of the carrier and/or the inside of pores of the carrier, so that the catalytic component is supported onto the carrier. By carrying out heat treatment at the same time as or after the stir-mixing, there is also carried out the following: to provide the catalytic activity; or to remove liquid components and/or salts from the catalyst precursor; or to strengthen the bonding force of the catalytic component to the carrier.

There has hitherto been known a process for supporting the catalytic component onto the carrier with various types of supporting treatment apparatuses. Some examples thereof include: a process that involves using a revolving-dish type apparatus such that a dish-shaped treatment container is revolved around the rotational axis to thereby tumble the carrier in the treatment container (for example, refer to Patent Document 1 and Patent Document 2 below); and a process that involves using a revolving-cylinder type apparatus such that a cylindrical treatment container is revolved around the rotational axis to thereby tumble the carrier (for example, refer to Patent Document 3 and Patent Document 4 below). In addition, other examples include a process that involves using a fluidized-bed granulation apparatus such that a liquid catalytic component is sprayed onto a carrier as fluidized by a gas stream (for example, refer to Patent Document 5 and Patent Document 6 below).

[Patent Document 1]
  JP-A-315147/1988
[Patent Document 2]
  JP-A-299797/1996
[Patent Document 3]
  JP-A-279030/1994
[Patent Document 4]
  JP-B-015176/1983
[Patent Document 5]
  JP-A-000930/1983
[Patent Document 6]
  JP-A-031171/1994

As to the catalysts for production of various chemicals (e.g. products, such as acrylic acid, methacrylic acid, ethylene oxide, phthalic anhydride, and maleic anhydride), their catalytic performances (e.g. the activity upon raw substances and the selectivity of the objective product) are naturally given priority. However, for industrially using the catalysts, it is ideal for them to satisfy all conditions such as the physical strength and the cost of producing the catalysts (e.g. yield and expense for operation).

As to the aforementioned conventional process for supporting the catalytic component onto the carrier by the stir-mixing, there are problems such that: the supporting ratio is low, and the production yield of the objective catalyst is low, and the physical strength of the supported catalyst is low.

As to the aforementioned apparatus carrying out the stir-mixing simply by revolving the treatment container (e.g. revolving-dish type apparatus and revolving-cylinder type apparatus), the stirring efficiency of the carrier and the catalyst precursor is not very good, and therefore, the ununiformity in the adhesion of the catalyst precursor to the carrier takes place, so that the dispersion occurs to the particle diameters of the catalyst as obtained by the supporting treatment. Particularly, in the case of the revolving-dish type apparatus that has hitherto most generally been used, the treatment is carried out in the dish type treatment container having a large area, and therefore a large quantity of the catalyst precursor remains adhering to the innef surface of the treatment container without being supported on the carrier. As a result, there are the problems such that: the production yield of the catalyst is low, and the physical strength of the catalyst is also low.

As to the fluidized-bed granulation apparatus, the resultant catalysts (particulate catalysts) violently collide with each other due to the gas stream, and therefore the catalytic component is easily peeled off.

Usually in the production of the catalyst, even if the carrier and the catalyst precursor are strongly stirred, the supporting of the catalytic component onto the carrier does not become better. In the case where the stirring is too strong like in such as the aforementioned fluidized-bed granulation apparatus, the catalytic component is rather not supported well. On the other hand, also in the case where the stirring is too weak, the uniformity or the yield is lowered, for example, because the catalyst precursor is locally supported onto the carrier or adheres to the treatment container.

SUMMARY OF THE INVENTION

A. Object of the Invention

An object of the present invention is to improve the aforementioned production process for the catalyst so that: the supporting of the catalytic component onto the carrier can efficiently be carried out, and the catalyst having an excellent physical strength can be obtained.

B. Disclosure of the Invention

The present inventors diligently studied in order to solve the above-mentioned problems. As a result, they have completed the present invention by finding out that: the above problems can be solved at a stroke if the carrier and the catalyst precursor including the catalytic component are mixed together by carrying out simultaneous revolution and rocking of the treatment container as charged with these materials.

That is to say, a production process for a catalyst, according to the present invention, is a production process for the catalyst including a particulate lwnp carrier and a catalytic component supported thereon; with the production process comprising the step of carrying out simultaneous revolution and rocking of a treatment container as charged with the carrier and a catalyst precursor including the catalytic component, thereby supporting the catalytic component onto the carrier.

These and other objects and the advantages of the present invention will be more fully apparent from the following detailed disclosure.

Figure 1:
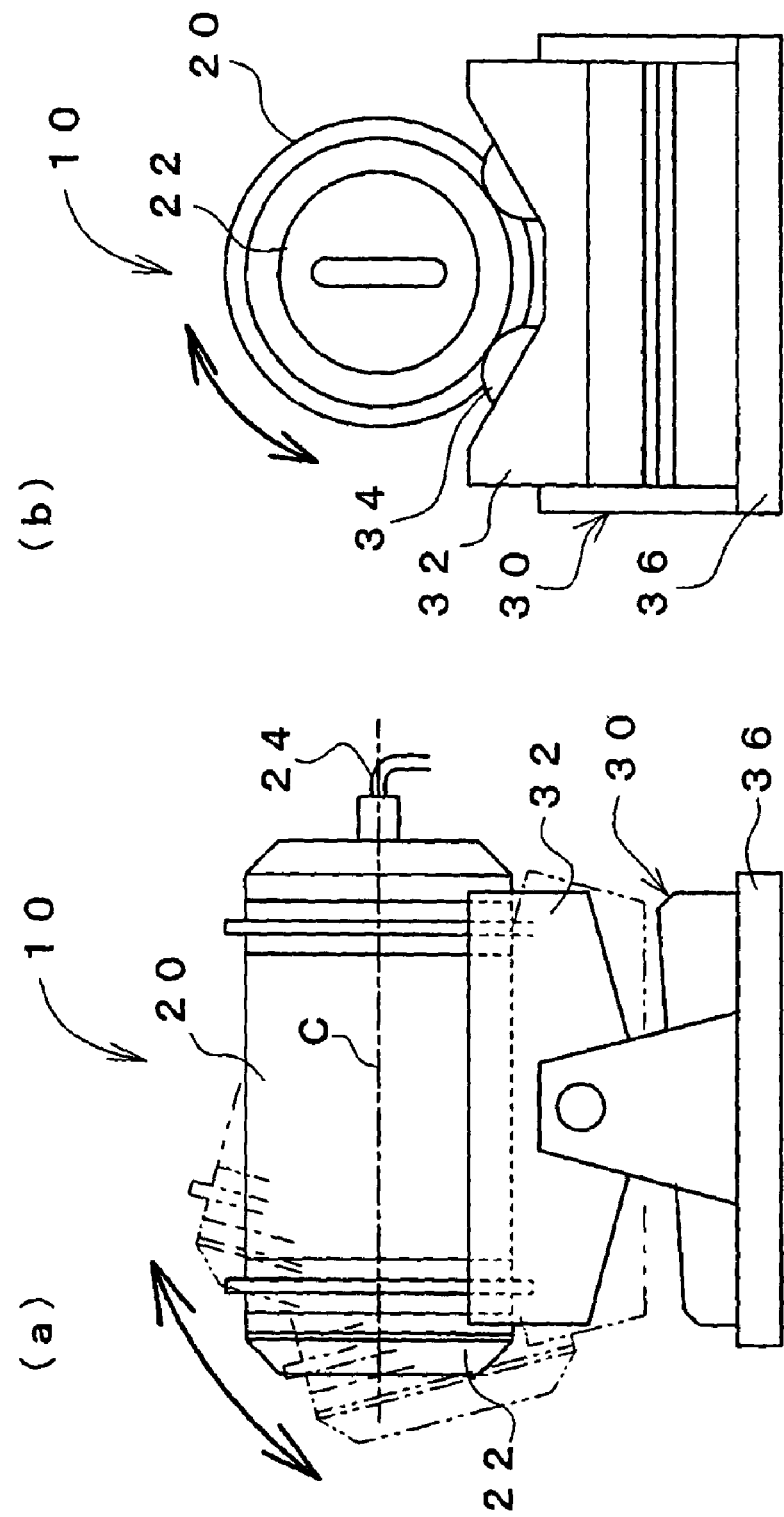
FIG. 1 is an outlined structural view of a supporting treatment apparatus which is usable for carrying out the present invention production process.

An explanation of the symbols is as follows.
10: Supporting treatment apparatus
20: Treatment container
22: Lid
24: Connection portion
30: Driving portion
32: Settlement portion
34: Driving roller
36: Supporting base portion
C: Central axis of treatment container

DETAILED DESCRIPTION OF THE INVENTION

Hereinafter, detailed descriptions are given item by item about the production process for the catalyst according to the present invention. However, the scope of the present invention is not bound to these descriptions. And other than the following illustrations can also be carried out in the form of appropriate modifications of the following illustrations within the scope not departing from the spirit of the present invention.

[Carrier]:

There can be applied the same as such as materials, forms, measurements of carriers that are generally utilized for supported catalysts. Suitable carriers are selected in consideration of such as kind, purposes of the use, uses, and requested performances of the catalyst.

Examples of materials of the carrier include alumina, silica, silica-alumina, titania, magnesia, silica-magnesia, silica-magnesia-alumina, zirconia, silicon carbide, silicon nitride, and zeolite. The carrier having unevenness and/or pores in its surfaces is suitable for supporting the catalytic component. Favorable are carriers having strength and/or durability so as to little be destroyed in the supporting treatment of the catalytic component and/or in the subsequent treatment for the production of the catalyst.

Examples of the shape of the carrier include a spherical shape, a columnar shape, a ring shape, and an irregular shape. The carrier having a spherical or columnar shape displays so good flowability in the treatment container that the catalytic component can uniformly be supported on the carrier. The spherical shape is particularly favorable.

As to the particle diameter of the carrier, its average particle diameter can be set in the range of 1 to 20 mm, favorably 2 to 15 mm, more favorably 3 to 10 mm.

It is also possible that at least two kinds of carriers different as to material, shape, or particle diameter range are used in combination with each other.

[Catalytic Component]:

Catalytic components that can be used are components (elements) that have hitherto been used for publicly known catalysts. Suitable catalytic components are selected in consideration of such as kind, purposes of the use, uses, and requested performances of the catalyst.

Examples of the catalytic component include molybdenum, bismuth, iron, vanadium, phosphorus, and titanium. It is also possible that at least two catalytic components are supported onto the carrier in combination with each other.

[Catalyst Precursor]:

The catalyst precursor is a supplying source for supplying the catalytic component which is to be supported onto the carrier. It is possible to use catalyst precursors that are utilized as sources for supplying the catalytic component in conventional catalyst productions.

The catalyst precursor may be the catalytic component itself, or a mixture of the catalytic component with a solvent and other components, or a material that already displays its catalytic activity in the stage of the supporting treatment onto the carrier, or a material that displays its catalytic activity by the subsequent treatment (e.g. calcining treatment). More particularly, examples thereof include powders including the catalytic component, solutions including the catalytic component, and suspensions including the catalytic component. Examples of the powders include pulverized products, molded products, and granulated products.

In the case where the catalyst precursor is a powder, its particle diameters can be set so as to be smaller than 800 μm, favorably smaller than 600 μm, more favorably smaller than 400 μm. In the case of using a powder having too large particle diameters, there is a possibility that: remarkable ununiformity in the adhesion of the catalytic component may occur, or the surfaces of the resultant catalyst may be so coarse as to be low in physical strength.

As to the powdery catalyst precursor, the beforehand prepared solution or suspension including the catalytic component is heat-treated to thereby obtain a solid catalyst precursor. Then, this catalyst precursor is used as it is or after being pulverized when the occasion demands. Usable as a means of the above heating are such as a drum dryer, a spray dryer, a box type heating apparatus, and a tunnel type heating apparatus. It is also possible that the solid catalyst precursor is obtained by vacuum drying. It is also possible that the powdery catalyst precursor as obtained in this way is further dispersed into a solvent so as to be usable as the suspension.

Examples of the above material to be the catalyst precursor include ammonium salts, nitrate salts, carbonate salts, sulfate salts, hydroxides, organic acid salts, and oxides of the aforementioned catalytic components, and further, mixtures of these materials.

[Binder]:

When the supporting treatment is carried out, it is possible to use binders (e.g. liquid binders) that promote the supporting of the catalytic component onto the carrier or make the supporting firm. Usable examples of the liquid binders include: water; and besides, organic compounds (e.g. ethylene glycol, glycerin, propionic acid, maleic acid, benzyl alcohol, propyl alcohol, butyl alcohol, polyvinyl alcohol, and phenol). Also, usable examples of other binders include nitric acid, ammonium nitrate, ammonium carbonate, cellulose, methyl cellulose, starch, and silica sol. It is also possible to use a mixture of at least two binders. Usually, water is favorably used.

The binder may be beforehand mixed into the catalyst precursor including the catalytic component. Or it is also possible that, separately from the catalyst precursor including the catalytic component, the binder is supplied into the treatment container of the supporting treatment apparatus when the supporting treatment is carried out.

The amount of the binder to be used can appropriately be set in accordance with the combination of the carrier and the catalyst precursor and/or with the requested catalytic performances. It is also possible that the amount of the binder to be supplied is appropriately adjusted in accordance with progress conditions of the supporting treatment.

[Reinforcement]:

The reinforcement has a function of attaining the enhancement in the strength of the catalyst. The reinforcement is effective in the case where: when the catalyst is packed, the distance of drop-packing the catalyst into a reaction tube is very long, or it is necessary to surely inhibit the catalytic component from peeling or falling off from the carrier.

Usable examples of the reinforcements include glass fibers, silicon carbide whiskers, silicon nitride whiskers, and silica sol.

The reinforcement may be added in the course of the step of preparing the catalyst precursor, or may be mixed into the prepared catalyst precursor. Or it is also possible that, separately from the carrier and/or other catalyst precursors, the reinforcement is supplied into the treatment container of the supporting treatment apparatus when the supporting treatment is carried out.

[Treatment Container]:

If the catalyst precursor and the carrier can be charged into the treatment container and then mixed together, it is possible to adopt the same container as treatment containers in conventional mixing apparatuses and granulation apparatuses.

It is favorable that a material that little produce a bad influence upon the carrier or the catalyst precursor is used for inner surfaces, contacting with the carrier and/or the catalyst precursor, of the treatment container. Specific usable examples of such a material include stainless steel, glass, ceramics, and chemical-resistant synthetic resins. The inner surfaces are usually made flat and smooth ones in order to facilitate the movement of charged materials. However, for efficiently mixing the catalyst precursor and the carrier having large particle diameters, it is effective to appropriately provide the inner surfaces with such as unevenness, projections, and baffles in order to promote the mixing of the charged materials.

Adoptable examples of the shape of the treatment container include a cylindrical shape, a conical shape, a spherical shape, a polyhedral shape, and a polygonal cylindrical shape. Thus, there is no especial limitation. A shape in combination of these shapes is also adoptable. Examples thereof include: a shape having a conical portion at both ends of the cylindrical shape, and a shape having a narrow portion midway in axial directions.

The supporting treatment can efficiently be carried out if there is performed the operation of revolving the treatment container around its central axis and rocking the central axis. In the case of the cylindrical treatment container, this container favorably has a length of 1 to 3 times of its diameter. The ratio of the length to the diameter (length/diameter) is more favorably in the range of 1.3–2.7, still more favorably 1.5–2.5. If the ratio of length/diameter is in the appropriate range, there are economical advantages in that the efficiency of the supporting treatment is so high that the supporting treatment apparatus can also be made compact. In the case where the ratio of length/diameter deviates from the appropriate range, there are economical disadvantages such that the efficiency of the supporting treatment is so low that a large apparatus is needed.

If the ratio of length/diameter is too small in the case where the capacity of the treatment container is the same, the diameter of the container is relatively large, and therefore there is a possibility that: the thickness of the charged materials may increase to result in a low mixing efficiency. In order to raise the mixing efficiency, the revolution rate of the treatment container must be raised more than is necessary, so that the revolution requires great motive power. If the ratio of length/diameter is too large, the distance for the charged materials to be moved by the rocking in the directions of the rotational axis is so long that the rocking rate is necessary to decrease and, as a result, there is a possibility that: the treatment time may become long, and also, a large apparatus may be needed. In addition, in both cases, there is a possibility that the optimum conditions of the revolution rate and the rocking rate may be difficult to set.

Hereupon, the above "diameter" refers to the inner diameter of the container in a cross section in the directions perpendicular to the central axis of the treatment container, and the above "length" refers to the distance between both ends of the inside of the container along the directions of the central axis of the treatment container.

The capacity of the treatment container is set in accordance with the requested treatment ability. In the production of industrial catalysts, it is usual to use a treatment container having a capacity of dozens of cubic decimeters to several cubic meters.

The treatment container is equipped with an opening through which such as the carrier and the catalyst precursor are charged or the treated catalyst is taken out. The opening can be equipped with a freely openable and closable lid. It is also possible to connect thereto a piping through which the catalyst precursor and the binder are supplied. The opening may be made connectable to a gas-exhausting and pressure-reducing apparatus.

The treatment container can be equipped with heating or cooling means, such as heaters and heating jackets for heating the charged materials.

[Supporting Treatment]:

The treatment container is charged with the carrier and the catalyst precursor including the catalytic component. In the case where also required but not beforehand mixed into the catalyst precursor, such as the aforementioned binder and/or reinforcement is also charged into the treatment container. The entire catalyst precursor and the entire carrier may be charged before the beginning of the treatment, or it is also possible that the catalyst precursor is added stepwise or continuously with the progress of the treatment. When the occasion demands, it is also possible that the binder liquid and/or the reinforcement is beforehand charged or additionally supplied.

The carrier is charged in an amount of 10 to 60%, favorably 20 to 50%, more favorably 25 to 45%, of the capacity of the treatment container. In the case where the charging amount is too large, there is a possibility that: it may be so difficult to sufficiently mix the carrier and the catalyst precursor that there occurs the dispersion among individual pieces of the carrier as to the quantity of the supported catalytic component, and therefore the catalytic component may be difficult to uniformly support onto the carrier. In the case where the charging amount is too small, there is a possibility that: the amount of the catalyst precursor adhering to inner surfaces of the treatment container may relatively increase to decrease the amount of the catalytic component as supported onto the carrier, thus resulting in a low yield of the supporting treatment. In addition, there is also an uneconomical possibility that the amount of the carrier that can be treated at the same time may be small.

The treatment container is simultaneously revolved and rocked. The catalytic component is supported onto the carrier by continuing this revolution and rocking for a definite time.

In the case where the treatment container is the shape of a cylinder, it is possible that: the central axis of the treatment container is horizontally oriented, and the treatment container is revolved around this central axis and is rocked in such a manner that the slope of the central axis are varied in upward and downward directions.

The revolution rate differs according also to such as the capacity of the treatment container and the requested performances of the supporting treatment, but the revolution rate can usually be set in the range of 5 to 60 rpm, favorably 10 to 50 rpm, more favorably 15 to 45 rpm. In the case where the revolution rate is too small, there is a possibility that the stirring efficiency may be low. In the case where the revolution rate is too large, there may occur problems such that the carrier repeats violent collision, so that; the catalyst precursor or catalytic component having adhered to the carrier falls off therefrom, or the carrier is damaged or pulverized to form a fine powder.

The revolution rate, namely, the revolution velocity, may be constant throughout the entire term of the supporting treatment, or it is also possible that the revolution velocity is changed in the course of the supporting treatment.

The rocking angle can be set in the range of 5 to 90°. The rocking angle can be defined as the maximum width of the angle at which the rotational axis of the treatment container inclines. In the case where the rocking angle is too small or too large, there is a possibility that the effects of improving the supporting treatment by the rocking cannot be achieved enough.

The rocking rate can be set in the range of 1 to 12 spm, favorably 1 to 10 spm, more favorably 1 to 8 spm. The unit spm is represented by the number of repeats of the rocking per minute when one to-and-fro motion of the rocking is counted as one repeat. In the case where the rocking rate is too small, there are almost no effects as obtained by the rocking, and therefore the mixing efficiency may be almost the same as those of the conventional revolving-cylinder type supporting treatment apparatuses. In the case where the rocking rate is too large, the treatment container inclines in the reverse direction before the charged materials sufficiently moves in the directions of the rotational axis. Therefore, as a result, the movement of the charged materials is little in the axial directions, and thus also in this case, there is a possibility that the mixing efficiency may not rise.

The rocking rate, namely, the rocking velocity, may be the same throughout the entire term of the supporting treatment, or it is also possible that the rocking velocity is changed midway.

As are respectively aforementioned, the revolution rate and rocking rate of the treatment container are favorably in the range of 5 to 60 rpm and in the range of 1 to 12 spm, respectively. As a more favorable mode, if the revolution rate and the rocking rate are set in the above ranges respectively and if the ratio of the rocking rate to the revolution rate (rocking rate (spin)/revolution rate (rpm)) is set so as not to be more than 0.8, then the supporting of the catalytic component can efficiently be carried out, and the yield and the strength of the catalyst can be raised, and the dispersion in particle diameter can be reduced. The ratio of rocking rate/revolution rate is favorably not more than 0.5, more favorably not more than 0.4.

The supporting treatment can be carried out stepwise with variation of treatment conditions, or the supply of such as the catalyst precursor can be carried out every step of such multistep supporting treatment. For example, it is possible to supply the carrier and the binder in a first step and the powder of the catalyst precursor in a second step.

The heating can be carried out at the same time as the revolution and rocking in the supporting treatment, thereby removing liquids such as water from the catalyst precursor and the binder. It is also possible that the treatment container is pressure-reduced by gas exhaustion to lower the boiling points of the liquids, thereby raising the removal rate of the liquids. As to the heating, the entirety of the treatment container can externally be heated, or it is also possible that the treatment container is internally heated by supplying a heated gas into the treatment container. During the supporting treatment, the heating is carried out either constantly or only in a specific stage. For example, the liquid components can be removed by carrying out the heating after the stir-mixing of the carrier, the liquid catalyst precursor, and the binder has sufficiently made progress.

[Supporting Treatment Apparatus]:

It is possible to use publicly known stir-mixing apparatuses or granulation apparatuses that are utilizable for production of various products, if the apparatuses are equipped with the aforementioned treatment container and can carry out the aforementioned supporting treatment.

As to the supporting treatment apparatus enabling the aforementioned revolution and rocking, it is possible to use apparatuses which are publicly known generally as mixing apparatuses of a revolution-rocking type (revolution-rocking type mixing apparatuses). Specific examples of these revolution-rocking type mixing apparatuses include: a stirring apparatus according to the invention as described in JP-B-003415/1982; a mixer equipped with a heating apparatus according to the invention as described in JP-B-042295/1993; and a mixing apparatus according to the invention as described in JP-A-192675/1998. More specific examples thereof include Rocking Mixer (trade name, produced by Aichi Denki Co., Ltd.) as equipped with a freely equippable and removable capsular treatment container.

As to the supporting treatment apparatus, if the aforementioned treatment container is freely equippable and removable, then the handling property is enhanced, for example, because the produced catalyst can be conveyed in a state left placed in the treatment container. If the supporting treatment apparatus is equipped with the heating apparatus for heating the treatment container or its inside, then the heating treatment can be carried out at the same time as the supporting treatment. If the supporting treatment apparatus is equipped with a liquid- and/or powder-supplying apparatus for supplying the catalyst precursor and/or the binder liquid into the treatment container, then the catalyst precursor and/or the binder liquid is easy to supply, and their additional supply is also easy to carry out during the supporting treatment. It is also possible that the supporting treatment apparatus is equipped with an apparatus for gas-exhausting or pressure-reducing the inside of the treatment container. Desirable is a supporting treatment apparatus which can adjust such as the revolution rate, rocking rate, and rocking angle of the treatment container.

FIG. 1 illustrates a schematic outlined structure of the supporting treatment apparatus to be used for the supporting treatment.

A supporting treatment apparatus 10 is a revolution-rocking type mixing apparatus, and can revolve and rock a stainless-steel-made treatment container 20.

The treatment container 20 is a roughly cylindrical air-tight container and has a freely openable and closable lid 20 at one end side. At the other end side, the treatment container 20 has an external-piping connection portion 24 that is revolvable with a rotary joint, and the connection portion 24 is connected with a spray nozzle (not shown in the drawing) inside of the treatment container 20.

The treatment container 20 is equipped to a driving apparatus so as to be freely equippable and removable in a state where the central axis C of the treatment container is horizontally oriented.

The driving apparatus has a settlement portion 32 that is to be equipped with the treatment container 20. The settlement portion 32 has a driving roller 34 that revolvedrives the treatment container 20 in contact with the outer circumference of the treatment container 20. The settlement portion 32 is supported by a supporting base portion 36. As is shown in FIG. 1(a), the settlement portion 32 is furnished in such a manner that the settlement portion 32 can repeat a right-and-left to-and fro motion while gyrating in the range of a definite angle to the supporting base portion 36 around a position of the furnishing to the supporting base portion 36, which position is under the central position in the axial directions of the treatment container 20. The treatment container 20 also carries out the same to-and-fro gyrating motion together with the settlement portion 32. As a result, the central axis, namely, the rotational axis C, of the treatment container 20 carries cut the upward and downward or diametrically opposite rocking such that its one end becomes higher or lower than the other end.

If the treatment container 20 is revolved and rocked in the supporting treatment apparatus 10 having such a structure, then the charged materials in the treatment container 20 slip down and tumble down from the higher position to the lower position in a circumferential direction along the inner surface of the treatment container 20 by the revolution and in the central-axis directions of the treatment container 20 by the rocking. In the treatment container 20, the charged materials carry out the three-dimensional complex motion in combination of the slipping-down and tumbling motions in the circumferential direction involved by the revolution and in the axial directions involved by the rocking. As a result, the entirety of the charged materials is stir-mixed efficiently and uniformly.

For example, in the case where the treatment container 20 is merely revolved like in the conventional manners, the charged materials are merely mixed by moving in the circumferential direction in the same cross section of the treatment container 20 and therefore hardly mixed in the axial directions. However, as to the above supporting treatment apparatus 10, the charged materials much move not only in the same cross section but also in the directions of the axis perpendicular to the cross section, so that the charged materials in the treatment container 20 are mixed uniformly and efficiently as a whole.

In addition, neither the carrier nor the catalyst precursor undergoes an extreme impact such as by collision with high-speed-revolving stirring blades or with each other in a high-speed gas stream. Particularly, the rocking merely gives the motion such that the carrier and the catalyst precursor slip down and tumble down by their own weights. Therefore the rocking can prevent the carrier from being damaged and destroyed or the supported catalytic component from peeling off. If the rates of the revolution and the rocking are appropriately set, then the carrier and the catalyst precursor can be stir-mixed so uniformly as to efficiently support the catalytic component onto the carrier without applying the excessive external force to the carrier or the catalyst precursor.

As to the carrier and the catalyst precursor to be subjected to the supporting treatment, the supporting treatment may be carried out by revolving and rocking the treatment container 20 in a state where the entirety of the predetermined amount is placed in the treatment container 20, or it is also possible that a portion of the catalyst precursor is added in the course of the supporting treatment. If the external-piping connection portion 24 is utilized, then such as the liquid catalyst precursor and/or the binder liquid for supporting can be additionally supplied in the course of the supporting treatment continuously or intermittently. The connection portion 24 can be utilized also for gas-exhausting and pressure-reducing the inside of the treatment container 20 or for feeding a heated gas thereinto.

[Catalyst Resultant from Supporting Treatment]:

If the supporting treatment is finished, there is obtained a particulate product including the particulate lump carrier and the catalytic component supported thereon.

The supporting ratio can be set according to the uses or object of the catalyst. Specifically, the supporting ratio can be changed by the amounts of the carrier and the catalyst precursor as supplied in the supporting treatment. However, there is a case where the entirety of the catalytic component as included in the catalyst precursor is not supported onto the carrier. Therefore, in order to achieve the objective supporting ratio, the amount of the catalyst precursor as supplied is set in consideration of the yield of the supporting treatment.

Frequently utilized as the catalyst is usually a catalyst having a supporting ratio of 5 to 98 mass %, favorably 10 to 95 mass %, wherein the supporting ratio is represented by the following equation:

Supporting ratio (mass %)=[(mass (g) of catalyst−mass (g) of carrier)/mass (g) of catalyst]×100

The catalyst as taken out of the treatment container can be utilized for various catalytic reactions, as it is or after it has been subjected to the heat treatment.

Examples of the heat treatment include: a step of drying the catalyst; and a step of calcining the catalyst.

In the calcination step, the catalytic activity is provided or unnecessary components are removed, or the catalytic component is firmly supported onto the carrier.

Calcination conditions such as calcination temperature and calcination time can appropriately be set in the range of calcination conditions for conventional catalyst production. The calcination atmosphere can be such as air atmosphere, nitrogen atmosphere, or reducible gas atmosphere.

In the case of using a powdery catalyst precursor that has already been calcined, there is a possibility that: it is enough that liquids (e.g. binders and solvents) are removed, and it is not necessary to carry out the calcination. In this case, the heat-treatment temperature is usually set so as to be the same as or lower than the calcination temperature.

The present invention production process can be applied to the production of various catalysts having the form such that the catalytic component is supported on the carrier.

For example, the resultant catalyst can be utilized as such as: a catalyst for production of ethylene oxide by gas phase oxidation of ethylene, which catalyst includes silver as a catalytic component; a catalyst for production of (meth) acrolein and (meth)acrylic acid by gas phase oxidation of propylene, isobutylene, tert-butyl alcohol or methyl tert-butyl alcohol, which catalyst includes molybdenum, bismuth, and iron; a catalyst for production of acrylic acid by gas phase oxidation of acrolein, which catalyst includes molybdenum and vanadium; a catalyst for production of methacrylic acid by gas phase oxidation of methacrolein, which catalyst includes molybdenum and phosphorus; a catalyst for production of phthalic anhydride by gas phase oxidation of o-xylene and/or naphthalene, which catalyst includes vanadium and titanium; a catalyst for production of maleic anhydride by gas phase oxidation of benzene, which catalyst includes molybdenum; a catalyst for production of maleic anhydride by gas phase oxidation of n-butane, which catalyst includes phosphorus and vanadium; a catalyst for production of acrolein and/or acrylic acid by gas phase oxidation of propane, which catalyst includes molybdenum; and a catalyst for production of pyromellitic anhydride by gas phase oxidation of durene, which catalyst includes vanadium. The present invention production process can be applied also to the production of: catalysts used for other catalytic gas phase oxidation reactions; catalysts for ammoxidation reactions; and catalysts for various catalytic reactions (e.g. hydrogenation reactions and dehydrogenation reactions).

It is desirable to appropriately set such as the kinds of the carrier and the catalyst precursor and treatment conditions of the supporting treatment in accordance with the kind of the catalyst to be produced. Also as to motion conditions of the aforementioned revolution and rocking of the treatment container, appropriate conditions are selected.

Hereinafter, descriptions are given about: a case of, by the present invention production process, producing the catalyst for the production of acrylic acid by the gas phase oxidation of acrolein, which catalyst includes molybdenum and vanadium (this catalyst may hereinafter be referred to simply as "catalyst for the production of acrylic acid"); and a case of, by the present invention production process, producing the catalyst for the production of acrolein and/or acrylic acid by the gas phase oxidation of propylene, which catalyst includes molybdenum, bismuth, and iron (this catalyst may hereinafter be referred to simply as "catalyst for the production of acrolein/acrylic acid").

The catalyst for the production of acrylic acid, for example, can be obtained via the following steps of: (1) obtaining a catalyst precursor from a mixed liquid of starting materials including molybdenum and vanadium as essential components (wherein the mixed liquid is in a state of an aqueous solution or slurry); (2) supporting this catalyst precursor onto a carrier with a liquid binder by the supporting treatment as referred to in the present invention; and (3) carrying out heat treatment of the resultant supported structure.

As to this catalyst for the production of acrylic acid, any catalyst can be used if it is a catalyst that includes an oxide and/or complex oxide including molybdenum and vanadium as essential components and makes it possible to form acrolein into acrylic acid by the catalytic gas phase oxidation reaction. However, the oxide and/or complex oxide including molybdenum and vanadium as essential components is favorably an oxide and/or complex oxide having a metal element composition of a general formula (1) below:

(1)

(where: Mo is molybdenum; V is vanadium; $A^1$ is niobium and/or tungsten; $B^1$ is at least one element selected from the group consisting of chromium, manganese, iron, cobalt, nickel, copper, zinc, and bismuth; $C^1$ is at least one element selected from the group consisting of tin, antimony, and tellurium; and O is oxygen; and further, a, b, c, d, e, and x denote atomic ratios of Mo, V, $A^1$, $B^1$, $C^1$, and O respectively, wherein, when a=12, then $1 \leq b \leq 14$, $0 < c \leq 12$, $0 < d \leq 10$, and $0 \leq e \leq 10$, and wherein x is a numerical value as determined by the oxidation state of each element).

There is no especial limitation on the starting materials of the above oxide and/or complex oxide. Ammonium salts, nitrate salts, carbonate salts, chlorides, sulfate salts, hydroxides, organic acid salts, and oxides of metal elements as generally used for this kind of catalyst, or mixtures of these materials, may be used in combinations with each other. However, the ammonium salts and the nitrate salts are favorably used.

The above-mentioned mixed liquid of the starting materials (starting-material-mixed liquid) may be prepared by a process as generally used for the production of this kind of catalyst. For example, the above starting materials are mixed into water one by one so as to form an aqueous solution or slurry. However, in the case where at least two aqueous solutions or slurries are prepared according to the kinds of the starting materials, these solutions or slurries may be mixed together one by one. There is no especial limitation on the conditions for the above mixing (e.g. mixing order, temperature, pressure, and pH).

The starting-material-mixed liquid, as obtained, is dried by various processes and then used as the catalyst precursor. Examples thereof include: a process carrying out the drying by heating; and a process carrying out the drying by pressure reduction. Above all, as to the heating process for obtaining the catalyst precursor and as to the form of the resultant catalyst precursor, for example, a powdery catalyst precursor may be obtained with such as a spray dryer or a drum dryer, or a blockish or flaky catalyst precursor may be obtained by heating under a gas stream with such as a box-type dryer or a tunnel-type dryer.

When the catalyst precursor is obtained, the heating conditions (e.g. heating temperature and heating time) should appropriately be selected according to the kinds of the heating apparatuses (e.g. dryers) and the properties of these heating apparatuses, and therefore cannot be specified sweepingly. However, for example, the heating temperature is favorably not higher than 230° C.

On the other hand, as to the process carrying out the drying by pressure reduction and as to the form of the resultant catalyst precursor, for example, a blockish or powdery catalyst precursor may be obtained with a vacuum dryer.

The catalyst precursor as obtained may be either a product as obtained merely by drying the starting-material-mixed liquid as it is (a product involving an ignition loss by removal of such as various salts if being excessively heated in addition), or a product as obtained by carrying out heat treatment of at least a portion of the catalyst precursor at high temperature (a product containing no volatiles formed by such as decomposition of various salts). Thus, there is no especial limitation.

The catalyst precursor as obtained is fed to the subsequent supporting step (supporting treatment) via, when the occasion demands, a pulverization step and/or classification step for obtaining a powder having appropriate particle diameters. The catalyst precursor as obtained may be fed to the supporting step after being subjected to a calcination step. Incidentally, although not especially limited, the above particle diameters of the powder of the catalyst precursor are favorably not larger than 500 μm.

In the supporting treatment, such as the liquid binder can be used when the catalyst precursor is supported onto the carrier. Specifically, examples of adoptable processes include: a process including the steps of adding the liquid binder to the catalyst precursor as obtained, and then mixing them together, and then supporting the resultant mixture onto a desirable carrier; or a process including the steps of dampening the above carrier with the liquid binder, and then adding the catalyst precursor to the dampened carrier, thereby carrying out the supporting.

Incidentally, when the above catalyst is obtained, besides the aforementioned production process, another process can also be adopted in which: being left a liquid without being dried; the starting-material-mixed liquid is absorbed by the desirable carrier or coated thereto or caused to adhere thereto, and then they are calcined.

As to the above liquid binder, there is no especial limitation on its kind. For example, there may be used the aforementioned liquid binder that can usually be used for supporting the catalytic component onto the carrier. However, an aqueous liquid binder or a liquid binder in the form of an aqueous solution is favorably used, and water is more favorably used.

In the case where, above all, the aqueous liquid binder or the liquid binder in the form of the aqueous solution is used as the liquid binder, its amount is favorably in the range of 2 to 20 parts by mass, more favorably 3 to 17 parts by mass, still more favorably 4 to 14 parts by mass, as water per 100 parts by mass of the catalyst precursor. In the case where the above amount is larger than 20 parts by mass, the viscosity of the catalyst precursor increases more than is necessary, and therefore there is a possibility that: particles of the resultant catalyst (particulate catalyst) may adhere to each other, or the resultant catalyst (particulate catalyst) may adhere and/or fix to inner surfaces of the supporting treatment container. On the other hand, in the case where the above amount is smaller than 2 parts by mass, the bonding force between the catalyst precursor and the carrier or between pieces of the catalyst precursor is so weak that there is a possibility that the supported catalyst precursor may become powdered or peeled off from the carrier just because weak external force is applied to the catalyst after the supporting treatment.

The above liquid binder can be used also in the form of an aqueous solution of various substances or in the form obtained by adding various substances and then mixing them. Examples of the above various substances include: reinforcements and binders for enhancing the strength of the catalyst; and substances that are generally used as pore-forming agents for forming pores in the catalyst. As to these substances, favorable ones are substances that do not produce bad influence on the catalytic performances (e.g. activity, and selectivity of the objective product) by being added. That is to say, favorable substances are: (i) substances that do not remain in the catalyst after the calcination; and (ii) substances that do not have bad influence on the catalytic performances even if these substances remain in the catalyst after the calcination.

Specific examples of the above (i) include the aforementioned binders.

Specific examples of the above (ii) include the aforementioned ones generally known as reinforcements.

In the case where the amount of the above substances as added is in excess, the physical strength of the resultant catalyst is remarkably low. Therefore it is favorable to add them in such an amount as does not lower the physical strength of the catalyst to such an extent that the catalyst cannot be practically used as an industrial catalyst.

As the carrier, the aforementioned carriers can be used.

As to the shape of the carrier, a spherical shape is particularly favorable because such a shape is good at flowability in the treatment container.

As to the particle diameters of the carrier, its average particle diameter is favorably in the range of 2 to 15 mm, more favorably 3 to 10 mm.

In the supporting treatment, the aforementioned treatment container is used to carry out the same as the aforementioned supporting treatment so that the catalytic component will be supported onto the carrier. Such as the amount of the carrier as charged relative to the capacity of the treatment container, and the revolution rate, the rocking rate, and the ratio of revolution rate/rocking rate of the treatment container, may appropriately be set in the aforementioned ranges.

The supporting ratio in the catalyst for the production of acrylic acid is appropriately determined in consideration of such as the oxidation reaction conditions and the activity and strength of the catalyst, but the supporting ratio is favorably in the range of 10 to 70 mass %, more favorably 15 to 50 mass %.

In the case where the catalyst for the production of acrylic acid is obtained by calcining the supported structure formed by supporting the catalyst precursor onto the carrier with such as the liquid binder, the calcination temperature is favorably in the range of 350 to 450° C., more favorably 380 to 420° C., and the calcination time is favorably in the range of about 1 to about 10 hours. Before the above calcination of the supported structure, the heat treatment of the supported structure may be carried out at a temperature lower than the calcination temperature.

In the case where a powdery calcined product as obtained by beforehand calcining the catalyst precursor is supported onto the carrier, thereafter there is a possibility that: it is enough that liquids (e.g. binders and solvents) are removed, and it is not necessary to carry out the calcination. In this case, the heat-treatment temperature is usually set so as to be the same as or lower than the calcination temperature. This point is the same also in the case where the below-mentioned catalyst for the production of acrolein/acrylic acid is obtained.

The catalyst for the production of acrolein/acrylic acid, for example, can be obtained via the following steps of: (1) obtaining a catalyst precursor from a mixed liquid of starting materials including molybdenum, bismuth, and iron as essential components (wherein the mixed liquid is in a state of an aqueous solution or slurry); (2) supporting this catalyst precursor onto a carrier with a liquid binder by the supporting treatment as referred to in the present invention; and (3) carrying out heat treatment of the resultant supported structure.

As to this catalyst for the production of acrolein/acrylic acid, any catalyst can be used if it is a catalyst that includes an oxide and/or complex oxide including molybdenum, bismuth, and iron as essential components and makes it possible to produce acrolein and/or acrylic acid from propylene by the catalytic gas phase oxidation reaction. However, the oxide and/or complex oxide including molybdenum, bismuth, and iron as essential components is favorably an oxide and/or complex oxide having a metal element composition of a general formula (2) below:

$$Mo_f W_g Bi_h Fe_i A^2_j B^2_k C^2_l D^2_m E^2_n O_y \qquad (2)$$

(where: Mo is molybdenum; W is tungsten; Bi is bismuth; Fe is iron; $A^2$ is at least one element selected from among cobalt and nickel; $B^2$ is at least one element selected from among sodium, potassium, rubidium, cesium, and thallium; $C^2$ is at least one element selected from among boron, phosphorus, chromium, manganese, zinc, arsenic, niobium, tin, antimony, tellurium, cerium, and lead; $D^2$ is at least one element selected from among silicon, aluminum, titanium, and zirconium; $E^2$ is at least one element selected from among alkaline earth metals; and O is oxygen; and further, f, g, h, i, j, k, l, m, n, and y denote atomic ratios of Mo, W, Bi, Fe, $A^2$, $B^2$, $C^2$, $D^2$, $E^2$, and O respectively, wherein, when f=12, then $0 \leq g \leq 5$, $0.1 \leq h \leq 10$, $0.1 \leq i \leq 20$, $1 \leq j \leq 20$, $0.001 \leq k \leq 5$, $0 \leq l \leq 10$, $0 \leq m \leq 30$, and $0 \leq n \leq 5$, and wherein y is a numerical value as determined by the oxidation state of each element).

As to the preparation of the catalyst for the production of acrolein/acrylic acid, all of such as preparation process and conditions for the aforementioned catalyst for the production of acrylic acid can be applied in the same way except that; the essential components in the mixture of the starting materials are changed to molybdenum, bismuth, and iron; and the supporting ratio and the calcination temperature are changed as shown below.

The supporting ratio in the catalyst for the production of acrolein/acrylic acid is appropriately determined in consideration of such as the oxidation reaction conditions and the activity and strength of the catalyst, but the supporting ratio is favorably in the range of 5 to 95 mass %, more favorably 20 to 90 mass %.

In the case where the catalyst for the production of acrolein/acrylic acid is obtained by calcining the supported structure formed by supporting the catalyst precursor onto the carrier with such as the liquid binder, the calcination temperature is favorably in the range of 350 to 600° C., more favorably 400 to 550° C.

(Effects and Advantages of the Invention):

In the present invention production process for the catalyst, because the treatment container as charged with the carrier and the catalyst precursor is revolved and at the same time rocked, the supporting of the catalytic component onto the carrier can efficiently and uniformly be carried out, and the yield and the strength of the catalyst can be raised, and the dispersion in particle diameter can be reduced.

DETAILED DESCRIPTION OF THE PREFERRED EMBODIMENTS

Specific techniques corresponding to examples of some preferred embodiments of the present invention and comparative examples not according to the present invention were carried out, and then their performances were evaluated. In the following description, the unit "part(s)" denotes part(s) by mass.

Hereinafter taken up as specific examples of the catalyst are as follows: a catalyst as used in the case of the production of acrylic acid by the gas phase oxidation of acrolein, a catalyst as used in the case of the production of acrolein and acrylic acid by the gas phase oxidation of propylene; and a catalyst as used in the case of the production of maleic anhydride by the gas phase oxidation of benzene. However, it is needless to say that the present invention is not a technique limited to the production of the above specific catalysts.

[Items of Performance Evaluation]:
<Supporting ratio and yield>:

Supporting ratio (mass %)=$[(X-Y)/X] \times 100$

Yield (mass %)=$[(X-Y)/(Z-Y)] \times 100$

X: mass of catalyst as produced
Y: mass of carrier as supplied into treatment container
Z: mass of catalyst as produced on the supposition that the entire catalyst precursor as supplied into the treatment container has been supported onto the carrier.

<Strength of Catalyst>:

In the operation of packing the catalyst into a reaction tube as used for the catalytic reaction, there is evaluated how little the catalyst is damaged and destroyed.

A stainless-steel-made reaction tube of 25 mm in inner diameter and 5,000 mm in length is set in the vertical directions. The lower end of the reaction tube is closed with a stainless-steel-made receiving plate of 1 mm in thickness. About 50 g of the catalyst to be subjected to the test is dropwise supplied into the reaction tube from the upper end of the reaction tube, and then the receiving plate is removed from the lower end of the reaction tube, and then the catalyst is gently extracted from the lower end of the reaction tube. The catalyst as extracted is passed through a sieve having a mesh opening size of 4 mm, and then the mass of the catalyst remaining on the sieve is measured. The strength of the catalyst is calculated from the measurement results in accordance with the following calculation equation:

Strength of catalyst (mass %)=$(A,B) \times 100$

A: mass of catalyst remaining on sieve
B: mass of catalyst as dropwise supplied from upper end of reaction tube The indicated higher value of the strength of the catalyst means that the catalyst is less damaged and destroyed when being supplied into the reaction tube. From that, it follows that the catalyst is little damaged and destroyed not only in the operation of packing the catalyst into the reaction tube but also in the catalyst handling which applies the external force to the catalyst.

<Standard Deviation of Particle Diameters>:

From the catalyst, 30 particles are selected at random to measure their respective particle diameters. The standard deviation a of the particle diameters is calculated from the measurement results.

EXAMPLE 1

<Carrier>:
Spherical silica-alumina carrier having particle diameters of 4.5 to 5.0 mm.

<Catalyst Precursor>:
While 20,000 parts of pure water was heat-stirred, 3,000 parts of ammonium molybdate, 663 parts of ammonium metavanadate, and 459 parts of ammonium paratungstate were dissolved therein. Separately, while 2,000 parts of pure water was heat-stirred, 855 parts of copper nitrate trihydrate was dissolved therein. The resultant two aqueous solutions were mixed together, thus obtaining a catalyst precursor in the form of a suspension.

<Supporting Treatment Apparatus>:
Rocking Mixer (model: RM-30) produced by Aichi Denki Co., Ltd.

An external heating unit is equipped thereto. The treatment container is roughly the shape of a cylinder of 285 mm in diameter, 540 mm in length, and about 30 dm³ in capacity.

The treatment container is equipped in a horizontal state, and then revolved around the central axis and at the same time rocked in the upward and downward directions.

<Supporting Treatment>:

The treatment container of the supporting treatment apparatus was charged with 9 dm³ of the carrier. To the treatment container, a piping which opens into the outside is connected through a rotary joint. A spray nozzle is set in the treatment container. A liquid as supplied from the external piping to the spray nozzle is sprayed into the treatment container. In addition, it is arranged that gases (e.g. vapors as generated in the treatment container) can be exhausted to the outside.

While the treatment container was revolved at a revolution rate of 30 rpm, the treatment container was rocked at 5 spm in a rocking angle of 40° (20° each upward and downward on the basis of the horizontal directions), and further the treatment container was heated by working the external heating unit. The temperature of the outer surface of the treatment container was in the range of 140 to 150° C. While the treatment container was revolved and rocked, gases generated by the heating were discharged out of the treatment container through the exhaust piping. At the same time, the suspension of the catalyst precursor was intermittently sprayed onto the carrier from the spray nozzle. It took 300 minutes to finish spraying a predetermined amount of the suspension.

The carrier of which the supporting treatment had been completed was taken out from the treatment container.

The carrier resultant from the supporting treatment was calcined at 400° C. under air atmosphere over a period of 6 hours, thus obtaining a catalyst A including the carrier and the catalytic components supported thereon.

The metal element composition (atomic ratio) of the catalyst A except for oxygen was $Mo_{12}V_4W_{1.2}Cu_{2.5}$.

COMPARATIVE EXAMPLE 1

A catalyst B was obtained by the same process as of Example 1 except that: the rocking of the treatment container in the supporting treatment was stopped, and only the revolution was carried out. However, the revolution was carried out in a state where the rotational axis of the treatment container was inclined at 20° to the horizontal plane.

EXAMPLE 2

A catalyst C was obtained in the same way as of Example 1 except that: the supporting treatment was carried out in a state where the inside of the treatment container was put under a reduced pressure of 100 hPa by connecting a vacuum pump to the exhaust piping which opened into the treatment container, It took 220 minutes to finish spraying the entirety of the predetermined amount of the suspension. Between the exhaust piping and the vacuum pump, there was set a trap for preventing such as water vapor (discharged from the treatment container) from flowing into the vacuum pump.

EXAMPLE 3

<Carrier>:

Spherical silica-alumina carrier having particle diameters of 4.5 to 5.0 mm.

<Catalyst Precursor>:

A suspension as obtained by the same process as of the catalyst precursor of Example 1 was dried with a drum dryer and thereafter calcined at 400° C. under air atmosphere over a period of 6 hours. The resultant calcined product was pulverized so as to have particle diameters of not larger than 500 μm, thus obtaining a powdery catalyst precursor.

<Supporting Treatment>:

The treatment container of the same supporting treatment apparatus as of Example 1 was charged with 6 dm³ of the carrier.

While the treatment container was revolved at a revolution rate of 15 rpm, the treatment container was rocked at 5 spm in a rocking angle of 40°. While the revolution and the rocking were continued, pure water to be a binder was sprayed into the treatment container from the spray nozzle. After the treatment had been carried out for 10 minutes, the revolution and rocking of the treatment container were once stopped. The catalyst precursor was rapidly supplied into the treatment container, and thereafter the revolution and rocking of the treatment container were carried out under the same conditions for 10 minutes again. Subsequently, the contents were taken out from the treatment container and thereafter heat-treated at 120° C. under air atmosphere over a period of 2 hours, thus obtaining a catalyst D including the carrier and the catalytic components supported thereon.

COMPARATIVE EXAMPLE 2

A catalyst E was obtained by the same process as of Example 3 except that: the rocking of the treatment container in the supporting treatment was stopped, and only the revolution was carried out. However, the revolution was carried out in a state where the rotational axis of the treatment container was inclined at 20° to the horizontal plane.

It was confirmed that, in the catalyst E as obtained, a carrier on which no catalytic components were supported was present in an amount of 5.1 mass % of the entirety.

COMPARATIVE EXAMPLE 3

The same process as of Example 3 was carried out except that: the rocking of the treatment container in the supporting treatment was stopped, and only the revolution was carried out. However, the powdery catalyst precursor hardly mixed with the carrier, and therefore the supporting treatment could not be carried out. Thus, the rocking rate was raised to 12 spm to carry out the same treatment. However, the supporting treatment was given up because the supported state was almost unchanged.

COMPARATIVE EXAMPLE 4

The same carrier and catalyst precursor as of Example 3 were used to carry out the supporting treatment with a revolving-dish type tumbling granulation apparatus (diameter of revolving dish: 1 m).

<Supporting Treatment>:

The revolving dish of the tumbling granulation apparatus was charged with 6 dm³ of the spherical silica-alumina carrier having particle diameters of 4.5 to 5.0 mm.

While the revolving dish was revolved at a revolution rate of 15 rpm in a state inclined at 20° to the horizontal plane, pure water to be a binder was sprayed onto the carrier. After the treatment had been carried out for 10 minutes, the powder of the same catalyst precursor as of Example 3 was added into the treatment container, thereby supporting the catalyst precursor onto the carrier. The treatment time was 28 minutes. Subsequently, the contents of the treatment container were taken out and thereafter heat-treated at 120° C. under air atmosphere over a period of 2 hours, thus obtaining a catalyst F.

EXAMPLE 4

A catalyst G was obtained by the same process as of Example 3 except that the revolution rate and rocking rate of the treatment container in the supporting treatment were changed to 13 rpm and 10 spm respectively.

EXAMPLE 5

<Carrier>:
Spherical silica-alumina carrier having particle diameters of 4.5 to 5.0 mm.

<Catalyst Precursor>:
While 20,000 parts of pure water was heat-stirred, 3,000 parts of ammonium molybdate and 191 parts of ammonium paratungstate were dissolved therein, and further 851 parts of 20 mass % silica sol was added thereto, thereby obtaining a mixed liquid. To this mixed liquid, a liquid as obtained by dissolving 2,060 parts of cobalt nitrate, 1,235 parts of nickel nitrate, 458 parts of iron nitrate, and 11.5 parts of potassium nitrate into 2,000 parts of pure water was dropwise added under vigorously stirred conditions. Subsequently, a liquid as obtained by dissolving 893 parts of bismuth nitrate into an aqueous solution was dropwise added thereto under vigorously stirred conditions, thereby obtaining a suspension, wherein the aqueous solution had been obtained by adding 500 parts of concentrated nitric acid to 1,000 parts of pure water. The suspension as obtained was dried with a drum dryer and thereafter calcined at 470° C. under air atmosphere over a period of 5 hours. The resultant calcined product was pulverized so as to have particle diameters of not larger than 500 μm, thus obtaining a powdery catalyst precursor.

<Supporting Treatment>:
The treatment container of the same supporting treatment apparatus as of Example 1 was charged with 6 dm³ of the carrier.

While the treatment container was revolved at a revolution rate of 15 rpm, the treatment container was rocked at 5 spm in a rocking angle of 40°. While the revolution and the rocking were continued, pure water to be a binder was sprayed into the treatment container from the spray nozzle. After the treatment had been carried out for 10 minutes, the revolution and rocking of the treatment container were once stopped. The catalyst precursor was rapidly supplied into the treatment container, and thereafter the revolution and rocking of the treatment container were carried out under the same conditions for 10 minutes again. Subsequently, the contents were taken out from the treatment container and thereafter heat-treated at 120° C. under air atmosphere over a period of 2 hours, thus obtaining a catalyst H including the carrier and the catalytic components supported thereon. The metal element composition (atomic ratio) of the catalyst H except for oxygen was $Mo_{12}W_{0.5}Co_5Ni_3Bi_{1.3}Fe_{0.8}Si_2K_{0.08}$.

COMPARATIVE EXAMPLE 5

The same carrier and catalyst precursor as of Example 5 were used to carry out the supporting treatment with the same revolving-dish type tumbling granulation apparatus as of Comparative Example 4.

<Supporting Treatment>:
The revolving dish of the tumbling granulation apparatus was charged with 6 dm³ of the spherical silica-alumina carrier having particle diameters of 4.5 to 5.0 mm.

While the revolving dish was revolved at a revolution rate of 15 rpm in a state inclined at 20° to the horizontal plane, pure water to be a binder was sprayed onto the carrier. After the treatment had been carried out for 10 minutes, the powder of the same catalyst precursor as of Example 5 was added into the treatment container, thereby supporting the catalyst precursor onto the carrier. The treatment time was 24 minutes. Subsequently, the contents of the treatment container were taken out and thereafter heat-treated at 120° C. under air atmosphere over a period of 2 hours, thus obtaining a catalyst I including the carrier and the catalytic components supported thereon.

EXAMPLE 6

<Carrier>:
Spherical silicon carbide carrier having particle diameters of 5.5 to 6.0 mm.

<Catalyst Precursor>:
While 10,000 parts of pure water was heat-stirred, 2,600 parts of oxalic acid, 2,400 parts of ammonium metavanadate, 1,630 parts of ammonium molybdate, 21 parts of silver nitrate, 94 parts of ammonium dihydrogenphosphate, 122 parts of sodium nitrate, and 32 parts of cesium nitrate were dissolved therein in order. Furthermore, 160 parts of silicon carbide whiskers having a diameter of 0.2 μm and a length of 20 μm were added to the resultant solution, and then they were sufficiently stir-mixed together, thus obtaining a suspension of a catalyst precursor.

<Supporting Treatment>:
The treatment container of the same supporting treatment apparatus as of Example 1 was charged with 12 dm³ of the carrier.

While the treatment container was revolved at a revolution rate of 30 rpm, the treatment container was rocked at 5 spm in a rocking angle of 40°, and further the treatment container was heated by working the external heating unit. The temperature of the outer surface of the treatment container was in the range of 140 to 150° C. While the treatment container was revolved and rocked, gases generated by the heating were discharged out of the treatment container through the exhaust piping. At the same time, the suspension of the catalyst precursor was intermittently sprayed onto the carrier from the spray nozzle. It took 300 minutes to finish spraying the entirety of the above suspension. Next, the contents of the treatment container were taken out and then calcined at 500° C. under air atmosphere over a period of 8 hours, thus obtaining a catalyst J including the carrier and the catalytic components supported thereon. The metal element composition (atomic ratio) of the catalyst J except for oxygen was $V_{100}Mo_{45}Ag_{0.6}P_4Na_7Cs_{0.8}$.

COMPARATIVE EXAMPLE 6

A catalyst K was obtained by the same process as of Example 6 except that: the rocking of the treatment container in the supporting treatment was stopped, and only the revolution was carried out. However, the revolution was carried out in a state where the rotational axis of the treatment container was inclined at 20° to the horizontal plane.

[Evaluation of Performances]:

TABLE 1

<Test results>

| Example (catalyst) | Supporting treatment (motion) | Supporting ratio mass % | Yield mass % | Strength of catalyst mass % | Standard deviation of particle diameters |
|---|---|---|---|---|---|
| Example 1 (A) | RM (revolution-rocking) | 24.7 | 97.6 | 99.2 | 0.070 |
| Comparative Example 1 (B) | RM (revolution) | 24.6 | 95.1 | 98.3 | 0.118 |
| Example 2 (C) | RM (revolution-rocking) | 24.8 | 98.2 | 99.4 | 0.070 |
| Example 3 (D) | RM (revolution-rocking) | 20.1 | 98.8 | 98.5 | 0.096 |
| Comparative Example 2 (E) | RM (revolution) | 20.2 | 96.0 | 96.5 | 0.131 |
| Comparative Example 3 (-) | RM (rocking) | -Supporting treatment was given up.- | | | |
| Comparative Example 4 (F) | Tumbling granulation apparatus (revolution) | 20.2 | 96.5 | 96.8 | 0.155 |
| Example 4 (G) | RM (revolution-rocking) | 20.0 | 98.1 | 97.8 | 0.123 |
| Example 5 (H) | RM (revolution-rocking) | 30.1 | 97.4 | 98.8 | 0.084 |
| Comparative Example 5 (I) | Tumbling granulation apparatus (revolution) | 30.1 | 95.2 | 95.9 | 0.201 |
| Example 6 (J) | RM (revolution-rocking) | 23.3 | 94.4 | 98.3 | 0.079 |
| Comparative Example 6 (K) | RM (revolution) | 22.6 | 90.8 | 96.9 | 0.101 |

※ RM: Rocking Mixer

<Evaluation>:

(1) From the comparison between Example 1 and Comparative Example 1, between Example 3 and Comparative Example 2, between Example 5 and Comparative Example 5, or between Example 6 and Comparative Example 6 (in each comparison, the carrier and the catalyst precursor are identical), it has been verified that: in Examples 1, 3, 5, and 6 in which the rocking was carried out in the supporting treatment, the yield and further the strength of the catalyst are higher, and the dispersion in particle diameter is also less, and therefore catalysts more excellent in quality and performance are obtained.

(2) Also in comparison with the supporting treatment of Comparative Examples 4 and 5 with the revolving-dish type tumbling granulation apparatus as hitherto generally used, clearly more excellent performances are achieved in Examples 1 to 3 and 5.

(3) If only the rocking is carried out like in Comparative Example 3, the supporting treatment cannot be carried out satisfactorily.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process of producing a catalyst, the catalyst including a particulate lump carrier and a catalytic component supported thereon, the process comprising the step of:
    carrying out simultaneous revolving and rocking of a treatment container charged with a particulate lump carrier and a catalyst precursor including a catalytic component, such that said catalytic component becomes to be supported on said particulate lump carrier, wherein:
    a) the treatment container is the shape of a cylinder having a length of 1 to 3 times of its diameter and has a horizontally oriented central axis;
    b) the carrier is charged in an amount of 10 to 60% of a capacity of the treatment container;
    c) the step of carrying out simultaneous revolving and rocking revolves the treatment container at 5 to 60 rpm around the central axis; and
    d) the step of carrying out simultaneous revolving and rocking rocks the central axis at 1 to 12 spm in an upward and downward rocking angle of 5 to 90° C.

2. The process according to claim 1, wherein the catalyst precursor is in the form of a member selected from the group consisting of a powder including the catalytic component, a solution including the catalytic component, and a suspension including the catalytic component.

* * * * *